United States Patent
Rose

Patent Number: 5,307,759
Date of Patent: May 3, 1994

[54] ELECTRONIC NOSECLIP FOR ANIMAL CONTROL

[76] Inventor: Andrew F. Rose, P.O. Box 1751, Cody, Wyo. 82414

[21] Appl. No.: 895,879

[22] Filed: Jun. 9, 1992

Related U.S. Application Data

[63] Continuation-in-part of Ser. No. 726,353, Jul. 5, 1991, abandoned.

[51] Int. Cl.[5] ............ A01K 3/00; G08B 23/00
[52] U.S. Cl. ............ 119/721; 119/908; 119/866; 340/573
[58] Field of Search ............ 119/29, 15, 96; 340/573, 539; 128/736

[56] References Cited

U.S. PATENT DOCUMENTS

| | | | |
|---|---|---|---|
| 3,589,337 | 6/1971 | Doss | 119/29 |
| 4,898,120 | 2/1990 | Brose | 119/29 |
| 4,967,695 | 11/1990 | Giunta | 119/29 |
| 4,996,945 | 3/1991 | Dix | 119/29 |
| 5,121,711 | 8/1992 | Aine | 119/29 |

Primary Examiner—John G. Weiss

[57] ABSTRACT

An animal training apparatus including a nose-supported housing, receiver and stimulus means. The housing is in the form of a noseclip containing a receiver responsive to a signal and activating electrical stimulus across and within the nasal septum. An outfitted animal is trained to develop a conditioned behavior in response to operation of the apparatus.

The housing consists of a barrel, bows, ends and pads. The interconnection is such that the pads may be rigidly affixed or pivotable with the ends. A single or plurality of transmitter define a pretermined area in which the apparatus are carried by animals, typically cattle, in which the user desires to control.

9 Claims, 3 Drawing Sheets

ELECTRONIC NOSECLIP FOR ANIMAL CONTROL

This is a continuation in part of application Ser. No. 07/726,353 filed Jul. 5, 1991, now abandoned.

This application in part discloses and claims subject matter disclosed in my earlier application, Ser. No. 07/726,353, filed Jul. 5, 1991, titled "Animal Control Device", now abandoned.

SUMMARY OF THE INVENTION

Prior disclosure relates problems of range management. The principal object of the present invention is the provision of an animal training apparatus adapted for attachment to the nose of an animal, wherein stimulus is administered in response to receiving a signal. It is a feature of the present invention to provide a housing in the form of a noseclip which permits for ease of installation and removal.

In another feature of the present invention, a housing is of such configuration to mechanically prevent an animal's tongue or teeth from reaching the ground surface, thereby minimizing overgrazing to individual plants.

Other features and advantages of the present invention will become apparent upon a review of the specification and the accompanying drawings, herein.

DESCRIPTION OF THE PREFERRED EMBODIMENTS OF THE INVENTION

Figure 1:
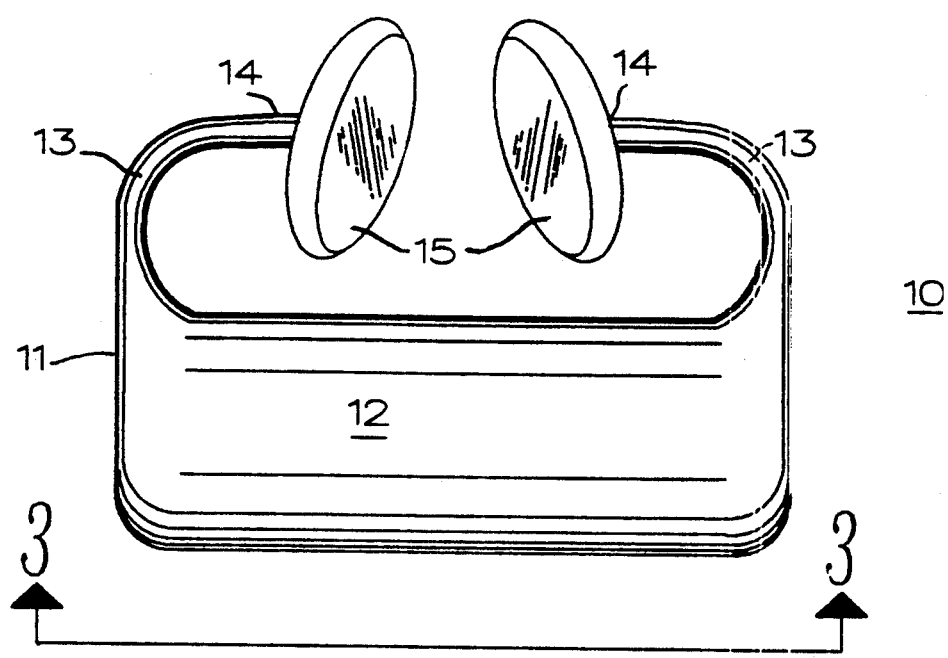
FIG. 1 is a diagram of a noseclip viewed from the front.
Figure 2:
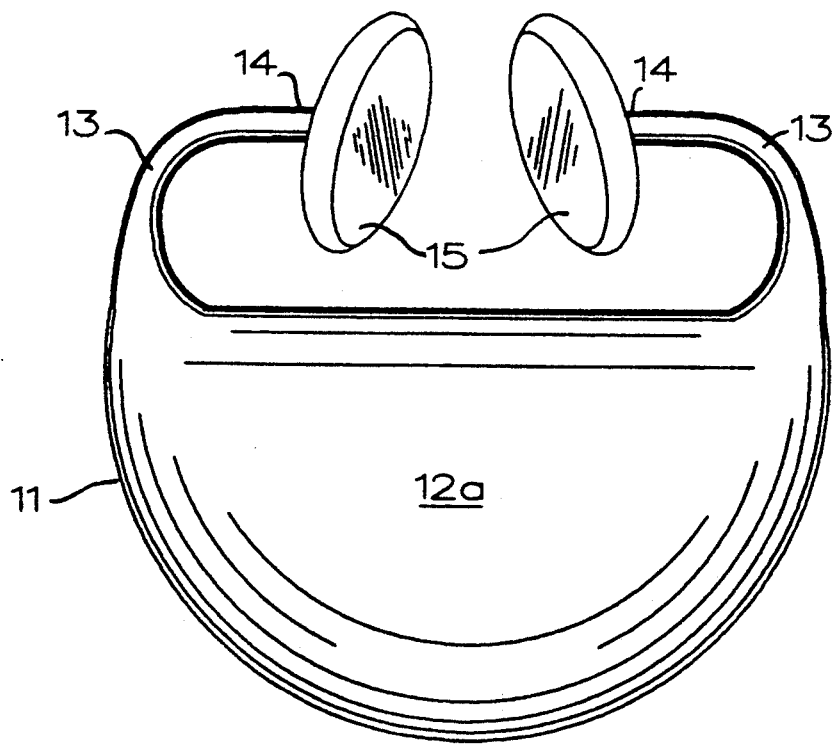
FIG. 2 is a variation of the noseclip of FIG. 1.
Figure 3:
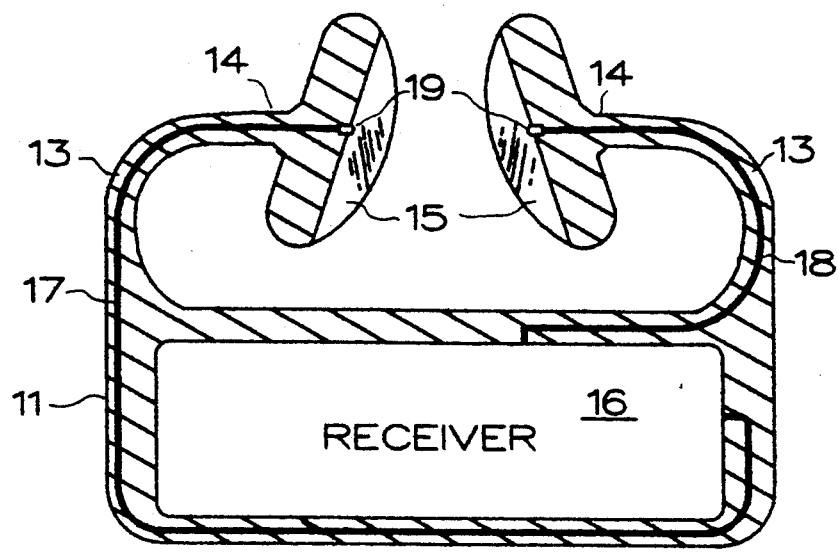
FIG. 3 is a sectional view of cutting plane 3—3 of FIG. 1.

Referring now to FIGS. 1–3 there is shown an apparatus incorporating embodiments of the present invention. FIG. 1 is a view of the preferred structural configuration of a noseclip 10 which includes a housing 11 containing a receiver 16 (FIG. 3) and electrodes 17 and 18 (FIG. 3). Shown on FIG. 1 is the barrel 12, bows 13, ends 14, and pads 15. The view is from the front of an animal which would be wearing this noseclip 10 in the nose. The pads 15 are oriented for a firm anatomical fit with the nasal septum of the nasal cavity.

The size of the housing 11 is generally about 30 to 60 mm along the length of the barrel 12, 20 to 40 mm from the bottom of the barrel 12 to the ends 14, and the pads 15 are generally 15 to 25 mm diameter. The pads 15 have a thickness generally of 8 mm. The pads 15 may be rigidly connected with the ends 14, preferably, but may also rotate relative to the ends 14 to minimize mechanical strain of nasal membranes. The bows 13 have mechanical properties and geometry permitting flexure and yet can maintain an even pressure of the pads 15 against the nasal septum. The noseclip 10 can be formed from a variety of materials, but preferably is an engineering plastic, such as acetal resin.

FIG. 2 shows a variation in the housing 11 of FIG. 1. The barrel 12a is of a spherical shape and of a larger size than the typical barrel 12. Enlarged barrel 12a structurally regulates how close to the ground a grazing animal may reach with tongue or teeth. Some herbivores, for example horses, actually "clip" grasses while other herbivores such as cattle may pull a plant out with the tongue. A variation in the size and shape of the typical barrel 12 results in less pull out of individual plants from the ground. While not the primary purpose of this invention, the size of the barrel 12 is an associated embodiment.

Referring next to FIG. 3, a receiver 16 is contained within the housing 11. Electrodes 17 and 18 are attached to the housing 11. The electrodes 17 and 18 terminate at the surface of the pads 15 in a cavity 19. The electrodes 17 and 18 are for delivering electrical stimulus shocks to the nose of the animal.

Figure 4:
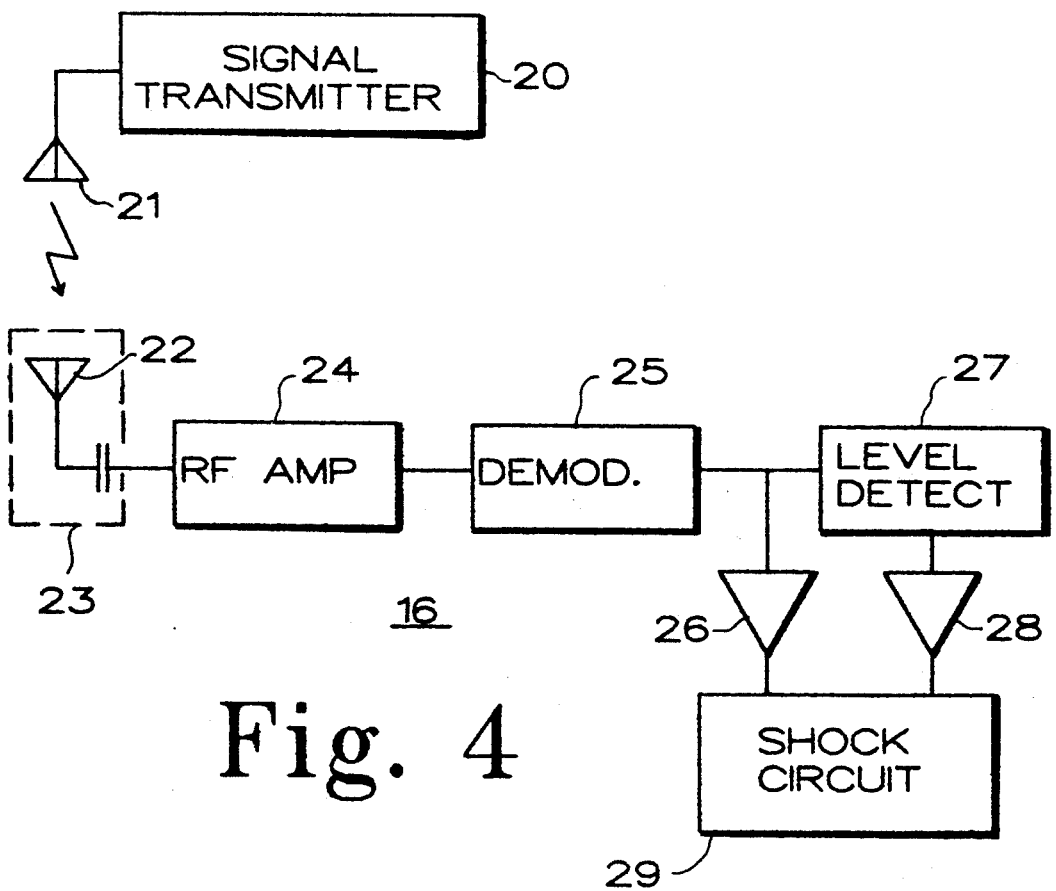
FIG. 4 is a schematic block diagram of a transmitter and the electrical components of the noseclip.

Referring now to FIG. 4, is shown a signal transmitter 20 and antenna 21. In the transmitter 20 a RF carrier is amplitude-modulated by a 640 HZ sine wave of varying amplitude. The two mixed signals are put into a buffer and drive the antenna 21 to produce a signal. This signal is varied in cycles of 20 HZ. The transmitted signal is encoded on two frequencies, 27.148 Mhz and 640 Hz for two reasons. First, it will prevent false activation of stimulus from lightning strikes (a common occurrence during the summer months in rangelands). If a lightning bolt strikes, an intense burst of energy can be picked up on the 27 Mhz band, however, this will most likely not be modulated. The lightning-induced signal will have a time-varying signal which will be demodulated by the receiver 16, but will have a low power content at the 640 Hz signal range.

Secondly, the 640 Hz transmitted signal can be used to increase the effect of electrical stimulus applied to an animal. An AC voltage to shock the animal will have more effect than a DC voltage. An AC signal applied at the nasal septum can penetrate more deeply into the body tissue, producing greater current and a greater neural effect. Creating a 640 Hz signal in the transmitter 20 and not having to recreate it in the receiver 16, will reduce the number of components.

Receiver 16 includes a ferrite-core loop antenna 22 to receive a transmitted signal and to act as a lumped inductance in a second-order LC bandpass circuit 23 centered at the transmitted signal frequency. When a signal is received it is amplified by an amplifier 24, then demodulated by a FET demodulator 25. The demodulator 25 acts as a high-pass and a low-pass circuit simultaneously to pass signals only at 640 Hz. The average level of a 640 Hz signal is detected and placed into a comparator 26. This comparator 26 switches at 640 Hz. The signal is also passed through a level detect 27 and comparator 28 to activate a shock circuit 29. When the level of the detected signal is greater than a reference threshold level (TH) the animal will receive a 640 Hz shock of constant amplitude.

Figure 5:
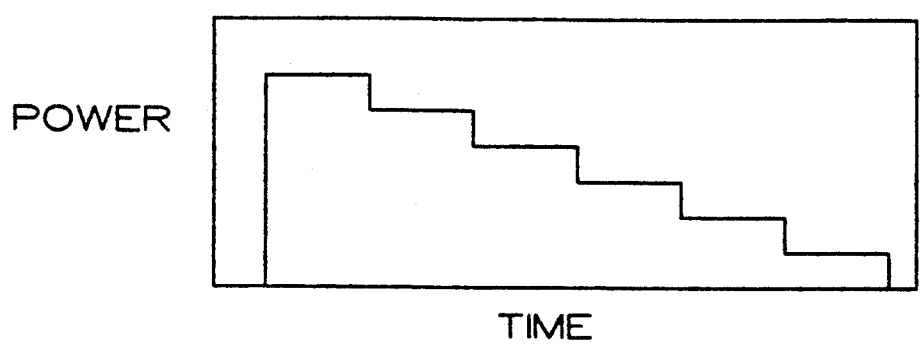
FIG. 5 is a diagram showing power versus time for a transmitted signal.
Figure 6A:
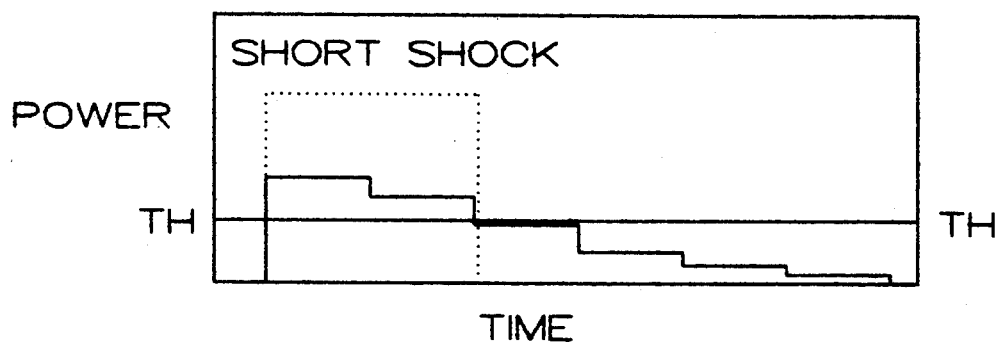
FIGS. 6A and 6B are diagrams showing power versus time for a received signal, threshold level, and the resulting shock for an animal far and near to the transmitter.
Figure 6B:
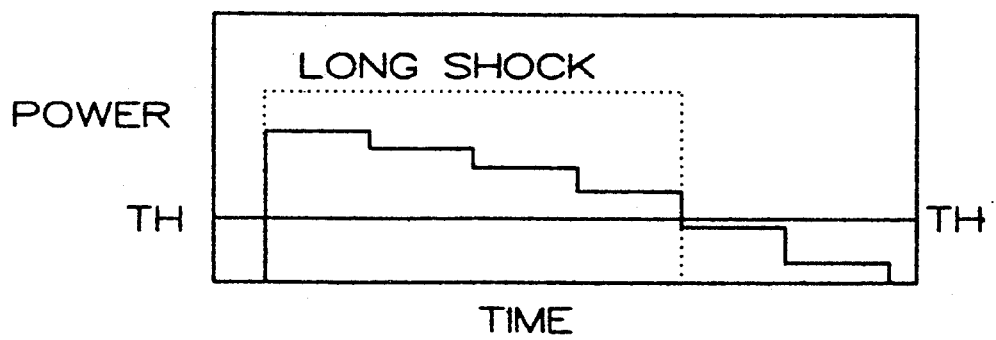

Referring now to FIG. 5, is shown power versus time for a typical signal produced by a transmitter 20. FIGS. 6A and 6B show, respectively, the received signal and duration of shock to be applied to an animal that is far or near to an antenna 21 connected to the transmitter 20. An animal wearing the noseclip 10 may be far from the antenna 21 and receive a "short shock" or the animal may be close to the antenna 21 and receive a "long shock" as related to the power level and threshold level.

Having described the mechanical and electrical components, I will now describe how to use the noseclip 10 with a typical transmitter 20. Although range cattle are anticipated to be the largest group of wearers of the noseclip 10, other animals may also be controlled.

As cattle are placed in a squeeze chute the animal is restrained. At this moment one takes a noseclip 10 and spreads the ends 14 apart with a set of expansion pliers or by hand pressure. The ends 14 are spread apart enough to permit placing the pads 15 into the individual nostrils of an animal to be controlled. The pressure of the pads 15 against each side of the nasal septum will maintain the noseclip 10 in place. The nose-supported housing 11 is adapted for attachment to the nose of the animal. Various sizes of the noseclip 10 are used for cattle of varying size or age (calves). During the summer grazing season the range cattle are typically placed in various areas and moved periodically. One locates an area in which the invention will help to regulate the location of grazing. A single or plurality of transmitters 20 and antenna 21 are placed to describe a transmitted signal overlying a predetermined area of land.

As an animal wanders or even if it should run towards this predetermined area it will enter a region of transmitted signal. The animal will initially receive a "short shock" as shown on FIG. 6A. If the animal continues across the predetermined area of land it will receive a "long shock" as shown on FIG. 6B. A pulse-width-modulation scheme is the preferred orientation to produce a greater shock duration, hence an animal response.

Alternatives to produce an animal response include modifying the stimulus means to administer a noxious smelling repellent into the nostrils of the animal. The stimulus means might include mechanical or audible stimuli which can also effectively control the location of the animal. The noseclip 10 may have additional features such as being individually adjusted by a mechanical or electromagnetic switch to change the levels, quantities and duration of stimulus.

While the preferred embodiments have been described, it should be understood that various changes, adaptations and modifications may be made therein without departing from the spirit of the invention and the scope of the appended claims.

What is claimed is:

1. An animal range management system for controlling the location and movement of an animal relative to a range area, the system comprising:
    a transmitter for transmitting a frequency signal over a predetermined area;
    a nose-supported housing adapted to be attached to the nose of an animal located in the area;
    a signal receiving means contained within said nose-supported housing for receiving the signal from the transmitter; and
    a stimulus means attached to the nose-supported housing for applying a stimulus to the nose of the animal in response to the signal received by the receiving means.

2. The system of claim 1, wherein the nose-supported housing comprises; a barrel;
    two bows with a first and second end on each bow, a first end of each bow affixed to a end of the barrel, each bow extending away from the barrel towards the other bow;
    a separate pad attached to the second end of each bow defining a space therebetween the pads for receiving the nasal septum of the nasal cavity of an animal.

3. The system of claim 2, wherein each pad is pivotable connected to the second end of each bow to allow the outer surfaces of the pads to fit firmly within the nose of various animal.

4. The system of claim 2, wherein said stimulus means is a varying duration shock, said shock is a pulsed alternating current at an intensity and duration to produce a conditioned behavioral response from the animal.

5. The system of claim 2, wherein said stimulus means increase in relation to increases in the signal from the transmitter.

6. The system of claim 1, wherein the system includes a plurality of transmitter to define a predetermined range area and a plurality of nose-supported housings adapted to be carried by the range animals.

7. A method to control the location and movement of an animal relative to a predetermined area, the method comprising the steps of:
    positioning a nose-supported housing in a nose of an animal, said nose-supported housing containing a means for receiving a frequency signal and a means for stimulating an animal in the nose in response to receiving a signal;
    placing a transmitter for transmitting a frequency signal over a given area
    generating said signal associated with the area wherein the signal is received by the nose-supported housing to create a stimulus to an animal within the area to control the movement of the animal.

8. The method of claim 7 including the steps of
    placing a plurality of transmitters in a range area to control the movement of an animal.

9. An animal training apparatus for use with a transmitter comprising:
    a nose-supported housing adapted to be attached tot he nose of an animal;
    a receiver contained within said nose-supported housing adapted to be centered at the frequency of such a transmitter, for receiving a signal; and
    stimulus means attached to said nose-supported housing for applying a stimulus to the nose of the animal in response to the signal received by said receiver.

* * * * *